(12) United States Patent
Nick

(10) Patent No.: US 6,222,434 B1
(45) Date of Patent: *Apr. 24, 2001

(54) SUPERCONDUCTING TOROIDAL MAGNET SYSTEM

(75) Inventor: Wolfgang Nick, Nürnberg (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,661

(22) Filed: Mar. 30, 1998

Related U.S. Application Data

(63) Continuation of application No. PCT/DE96/01863, filed on Sep. 27, 1996.

(30) Foreign Application Priority Data

Sep. 29, 1995 (DE) .............................................. 195 36 469

(51) Int. Cl.[7] ...................................................... H01F 1/00
(52) U.S. Cl. ........................................... 335/216; 505/868
(58) Field of Search ................... 335/216; 324/318–321; 505/868, 869

(56) References Cited

U.S. PATENT DOCUMENTS

| | | |
|---|---|---|
| 3,711,744 | 1/1973 | Luton, Jr. . |
| 4,079,305 * | 3/1978 | Peterson et al. ...................... 363/27 |
| 4,584,518 * | 4/1986 | Higashino et al. .................. 323/324 |
| 4,920,095 * | 4/1990 | Ishigaki et al. ........................ 505/1 |
| 5,146,383 | 9/1992 | Logan . |
| 5,160,911 | 11/1992 | Herring . |
| 5,361,055 | 11/1994 | Peck . |
| 5,374,914 * | 12/1994 | Prueitt ................................ 335/216 |
| 5,532,638 * | 7/1996 | Kubo et al. ......................... 327/368 |

FOREIGN PATENT DOCUMENTS

| | | |
|---|---|---|
| 3005227 | 8/1980 | (DE) . |
| 0348465B1 | 1/1990 | (EP) . |
| 2618955 | 2/1989 | (FR) . |
| 89/05033 | 6/1989 | (WO) . |

OTHER PUBLICATIONS

Japanese Patent Abstract No. 06325933 (Yukio et al.), dated Nov. 25, 1994.

"LHC Magnet Quench Protection System", L. Coull et al., 8108 IEEE Transactions on Magnetics 30, 1994, No. 4, Pt. 2, New York, pp. 1742–1745 (no date).

\* cited by examiner

*Primary Examiner*—Lincoln Donovan
(74) *Attorney, Agent, or Firm*—Herbert L. Lerner; Laurence A. Greenberg; Werner H. Stemer

(57) ABSTRACT

A superconducting toroidal magnet system includes magnet segments subdivided into two groups, wherein each group has its own supply device, in order to prevent a total failure from local overheating in the event of a quench. The supply devices are constructed with low impedance. This promotes a so-called current swing between the groups.

5 Claims, 2 Drawing Sheets

SUPERCONDUCTING TOROIDAL MAGNET SYSTEM

CROSS-REFERENCE TO RELATED APPLICATION

This application is a continuation of International Application Ser. No. PCT/DE96/01863, filed Sep. 27, 1996, which designated the United States.

BACKGROUND OF THE INVENTION

FIELD OF THE INVENTION

The invention relates to a superconducting toroidal magnet system.

In electrical power technology, the question of the extent to which superconducting magnet systems are suitable at appropriate cost for storing electrical energy has been the subject of recent investigation. Such systems are also known by the abbreviation SMES (Superconducting Magnetic Energy Store).

A superconducting energy store or accumulator is known, for instance, from European Patent 0 348 465 B1. The current store or accumulator shown therein has a toroidal coil system with many subcoils. The various subcoils or coil segments can be selectively connected in series or parallel and can be connected to a supply device for charging or discharging the entire configuration. It is also provided that for charging, for instance, only some of the coil segments are connected together. The interconnection of the coil segments can also be different for charging and for discharging. It is also possible for the energy store or accumulator to be loaded with a series circuit of some of the coil segments or all of the coil segments, and to discharge it in a parallel circuit.

In such superconducting magnet systems, what is known as a quench situation can arise, which can be considered a structural problem. In it, the superconduction is interrupted at one point in the superconductor by an excessive temperature increase.

The tripping event may be a very small local release of energy, which leads to a temperature increase of only a few degrees. However, since the superconductor is normally conductive, that is highly resistive, above its so-called transition temperature, the electrical current must be absorbed by so-called stabilizing material, for example highly conductive copper into which the superconductor is embedded. That leads to further local heating due to so-called Joulean losses, the heat spreads, and the normally conducting zone grows.

Unless countermeasures were taken, that process would not end until all of the energy inductively stored in the magnet of the system was dissipated. When large amounts of energy are stored, the temperature in the hot zone ("hot spot") could become so high as to cause destruction of the magnet.

In order to overcome that problem, either as much energy as possible can be extracted (case a), or the heated zone in the magnet system can be increased spatially, so that the resultant maximum temperature is not as high (case b).

In case a, when there are large quantities of energy stored, a limitation exists through the use of the discharge voltage (because P=U×I!). The higher the voltage, the faster the energy can be extracted. The lower it is, the lower the maximum temperature which is then attained.

In case b, further quenching locations must be created in the magnet system. That can be carried out, for instance, by externally supplied quench heaters. However, the safety of the magnet system in the quench situation, after quenching is detected, depends on the tripping and functional reliability of the quench heaters. After that so-called secondary quench is created, the entire coil system may finally have to be run down until cold before operation can be resumed. Until then, the coil system is unavailable.

U.S. Pat. No. 5,146,383 discloses a superconducting magnetic energy storing system in which a plurality of magnet systems are divided into two groups. Each of the two groups has an associated supply device. A device for mutual takeover of current between the groups is provided. The magnet systems of the various groups are connected electrically in series.

SUMMARY OF THE INVENTION

It is accordingly an object of the invention to provide a superconducting toroidal magnet system, which overcomes the hereinafore-mentioned disadvantages of the heretofore-known devices of this general type and in which operation can be at least partially maintained in a simple way, with as little energy as possible being dissipated, upon the occurrence of a quench.

With the foregoing and other objects in view there is provided, in accordance with the invention, a superconducting toroidal magnet system, comprising a plurality of annularly disposed magnet segments each assigned to one of at least two groups; common supply devices each connected to the magnet segments of a respective one of the groups, the common supply devices each including a device for mutual current takeover between the groups; and the magnet segments of the respective groups connected alternatingly in rings and each connected electrically in series.

In this way, an economical protection concept for the magnet system is provided, in which heating can be limited to the affected group in the quench situation. That is, the discharge takes place only for the affected group, so that despite the quench the overall system is still available with the capacity of the other groups. A quasi-automatic creation of secondary quenches occurs. In this process, largely physically automatic mechanisms are employed, which allow a reliable function of the magnet system without requiring expensive control devices. Moreover, the magnet system of the invention is available again more quickly after a failure, than a system of the prior art. That is, in the event of a failure, the energy of the system can be quasi-extracted or dissipated.

Preferably, the magnet segments of the groups are disposed alternatingly in rings. In this way, a uniform distribution of force and energy is provided.

The magnet segments of one group are preferably connected in series. In this way, the layout and the course of the conductors prove to be very simple, and the operating state of all of the individual magnets is always well-defined, regardless of any possible asymmetries.

In accordance with another feature of the invention, the supply devices of the various groups may be formed by an inverter, which may optionally be computer-controlled. Fast, reliable open-loop and closed-loop control of the magnet system is thus possible, and special operating modes or processes or monitoring operations are provided in the form of programs in the computer. This pertains especially to the function of current takeover, which establishes the energy equilibrium in the magnet system.

The magnet system is preferentially used as an energy store or accumulator with a large energy content for reserve purposes or buffer storage of energy and high-voltage or medium-voltage networks. Such a magnet system is rapidly available and because of its high operating safety is very reliable if there is a failure in the event of a quench.

In a preferred embodiment, the magnet system has only two groups, each with its own supply device. In this way, each magnet segment has a symmetrical environment, which is highly favorable with regard to the forces in the magnet system.

In accordance with a further feature of the invention, there is provided a sensor device for detecting a quench event, which is connected to the supply devices through a monitoring device. In this way, a targeted open-loop control of energy distribution, or even a closed-loop control, can be performed. This is especially favorable for active intervention in the event of a problem.

In accordance with an added feature of the invention, the supply devices have a low-impedance internal resistor as their device for mutual current takeover. This makes for an especially simple structure. This embodiment already provides improved performance as compared with the prior art.

In accordance with an additional feature of the invention, the groups are constructed to be galvanically or electrically separate. As a result, lower voltages to ground are possible.

In accordance with a concomitant feature of the invention, the magnet system serves as an energy store or accumulator.

Other features which are considered as characteristic for the invention are set forth in the appended claims.

Although the invention is illustrated and described herein as embodied in a superconducting toroidal magnet system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring initially to the figures of the drawings as a whole, there is seen a superconducting magnet system in which the object is to prevent destruction from overheating of a hot spot in the event of a quench. Problematic side effects, and especially unacceptable forces, must be averted in the process.

To that end, a superconducting toroidal magnet system is divided into two partial circuits, so that one magnet segment will belong to one group a or b in alternation (the term magnet segment is understood in this case to mean a magnet, or even better a magnet coil). As a result, each magnet segment always has a symmetrical environment, even if different currents flow in the two groups. In other words, there are no resultant forces in the circumferential direction. The central force remains the same or at least on the same order of magnitude as in normal operation ($I1=I2$).

Referring now to the figures of the drawings in detail and first, particularly, to FIG. 1 thereof, the performance of the novel divided magnet system in the event of a quench will first be explained. Components belonging to the same group will be identified by the same letters (example: group a, coil La).

Figure 1:
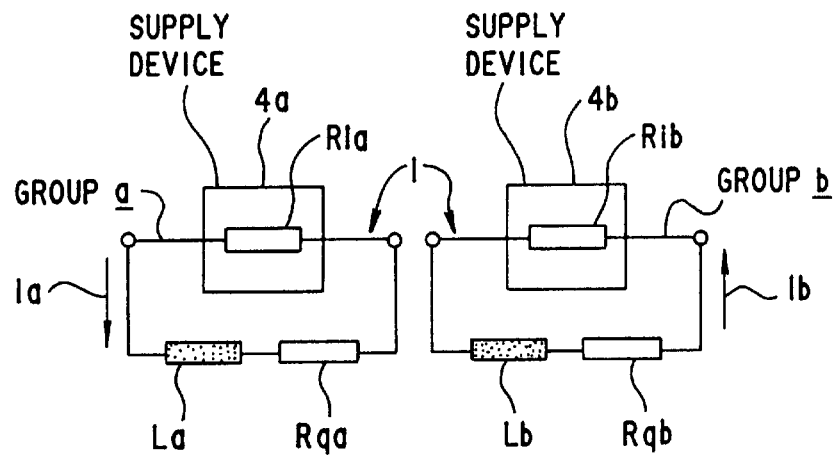
FIG. 1 is a substitute electrical circuit diagram for a magnet system having two groups.

FIG. 1 shows a substitute circuit diagram for a magnet system 1, in which two inductances La and Lb each represent an effective total inductance (including their respective inductance from interactions) of respective groups a and b. The inductances La and Lb (or the magnets) of the respective groups a and b are highly inductively coupled to one another. Resistors Rqa and Rqb symbolize respective quench resistances, which are negligibly slight in unimpeded operation.

The inductances La and Lb of the groups a and b are each connected to a respective associated supply device 4a and 4b. These supply devices each have one respective internal resistor Ria and Rib. The internal resistors Ria, Rib are constructed with low impedance, and an inductive coupling between them, or more accurately between the supply devices 4a, 4b, is small. The internal resistors Ria and Rib provide a device for mutual current takeover between the groups a, b.

A quench in group a causes an increase in the resistance Rqa, which in turn causes an increase in the voltage (ohmic resistor) dropping at it and finally a lowering of a current Ia because of the inductance La. As a result, a current Ib rises, since a flow through the configuration including the coupled inductances La and Lb seeks to remain constant. A great increase in the current Ib leads to the tripping of further quenches at many locations in the magnet coils of group b (parallel to the inductance Lb), namely wherever either a maximum induction Bmax prevails or the AC losses that are produced are maximal.

The consequence of this is a sudden pronounced ohmic voltage rise in the resistor Rqb, which further reduces the current Ib. There is a feedback effect on the current Ia, which then rises again. As a consequence, further secondary quenches are then generated in the coil La. The effect of the migration of the current increase from one group to the next can be referred to as a "current swing". The groups are preferably galvanically separate, so that low voltages to ground are possible.

The "current swing" is made possible by physical measures and in the simplest case it namely already takes place through the use of the low-impedance outputs of the various supply devices (inverters or power packs), that is without external intervention. The supply devices can even actively reinforce this performance as well, making faster and safer discharging of the system possible. A distinction can be made between the following cases:

a) secondary quenches are to be generated, and
b) as much energy as possible is to be transferred to the unaffected group, or "rescued". The unaffected group or groups should not quench.

Case a)

After a quench is detected by a sensor device, the supply device in the quenching group generates a voltage that reduces the current in that group as fast as possible. In the unaffected group, the procedure is vice versa: There, a voltage is generated that increases the inductive effect, which increases the current. A limit to the current height is set by the current-carrying capacity of the components of the supply device, especially the semiconductors of the inverters.

If quench events are then subsequently tripped in that group, for instance if the critical current is exceeded or because of alternating current losses, the procedure in the two supply devices is transposed. That is, the various supply devices 4a or 4b each encounter the quench events in the respective group a or b, thereby exciting the current swing. Accordingly, they have an exciting function. The advantage of proceeding in this way with such a strategy is that the energy is largely distributed or dissipated in the system.

Case b)

After a quench is detected, the supply device of the quenching group generates a voltage that reduces the associated current as fast as possible. In the other group, through the use of the associated supply device, the current is raised to a predetermined level, optionally at a limited rate, in such a way that while no secondary quench is generated in this case, nevertheless as much energy as possible continues to be stored. The intent in particular is not to trip any quench events from AC losses.

Next, the supply device of this group must compensate for the inductive voltages that continue to be caused by the quenching group, until the current has dropped to zero. To this extent, energy from one group is magnetically transferred to the other group and extracted there. The advantage of proceeding in this way is that an energy store or accumulator is still available even in the event of a quench.

In order to detect a quench, non-illustrated sensor devices, in particular quench detectors, which may be provided are connected to the control devices of the supply devices through suitable monitoring devices. The sensor device is required, especially in the case of a closed-loop controlled current swing. Thus intervention can be carried out automatically in a targeted way in the event of a quench.

Figure 2:
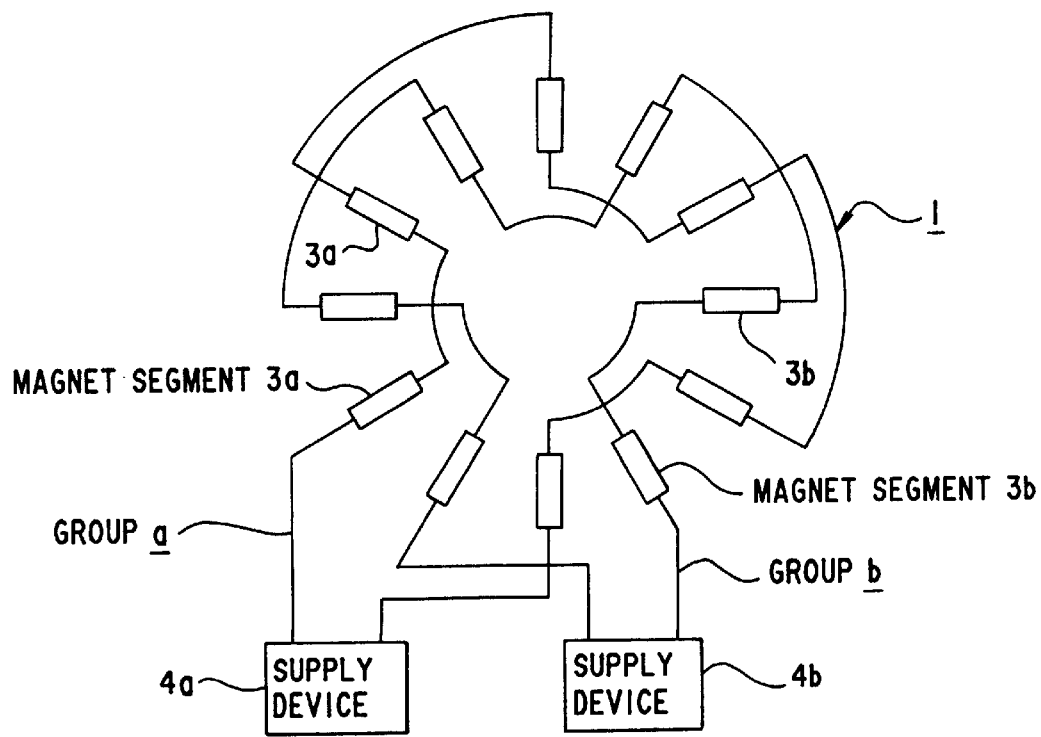
FIG. 2 is a fundamental illustration of a magnet system with two groups.
Figure 3:
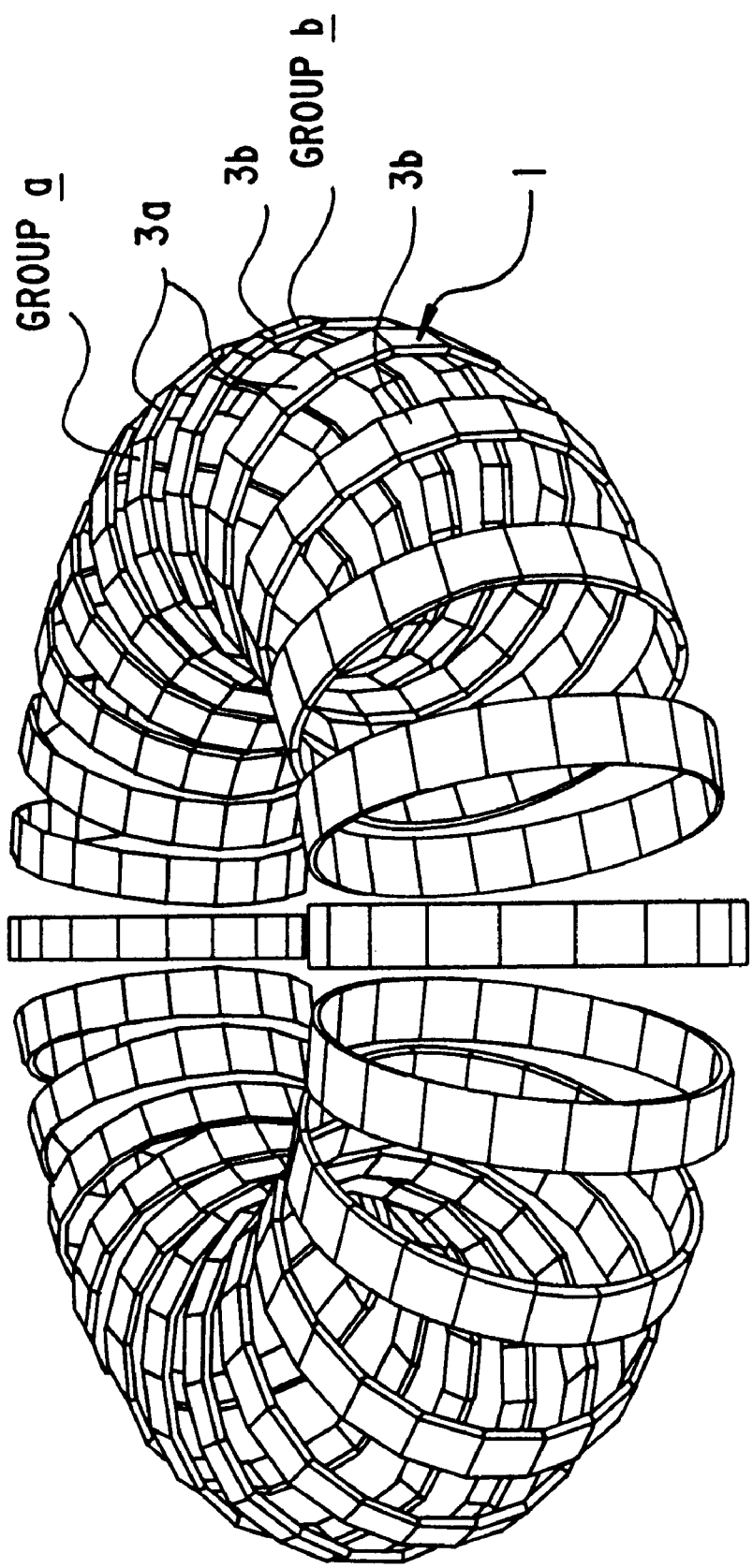
FIG. 3 is a diagrammatic, perspective view of magnet segments of the magnet system.

FIG. 2 shows a layout of the novel magnet system 1 in a fundamental illustration. A diagrammatic, three-dimensional view of the magnet system 1 with many magnet segments 3a, 3b is shown in FIG. 3.

As in the prior art, the magnet system 1 has annularly disposed magnets or magnet coils, which are constructed as superconducting magnet segments 3a, 3b and form a toroidal shape. They are disposed in a non-illustrated cryostat vessel with a suitable cooling device. The magnet segments 3a, 3b are divided up into two groups (groups a and b). The magnet segments 3a, 3b of the respective groups a and b are disposed alternatingly in rings (that is, in alternation, one magnet segment from group a and then one from group b, and so forth). The magnet segments 3a, 3b of one respective group a and b are each connected in series and connected to an associated respective supply device 4a and 4b.

The supply devices 4a, 4b are preferably constructed as computer-controlled inverters. To that end, they have non-illustrated open-loop control devices, which are provided with suitable open and closed-loop control programs. Optionally, they also have monitoring and protection devices for detecting errors, and especially quench events, in the magnet system 1.

Since the quench events are distributed over relatively many locations, the magnet system can internally distribute the energy previously stored in it without having to employ some external dissipator. That is, the heating is distributed over the entire magnet system, without exceeding a maximum temperature.

Moreover, there is now the possibility of discharging one group externally (for instance, through the supply device 4a, 4b constructed as an inverter). This brings still other advantages, if the affected group can be rapidly discharged:

through the use of suitable open-loop control, as much energy as the unaffected group can still store can be "rescued" or shifted over to that group; in other words, an energy redistribution takes place (possibly even without tripping secondary quenches);

the group that is still functional can continue to operate, so that in the present case, the magnet system is still available with at least a large portion of its capacity (emergency or auxiliary operation);

since only one group is affected by the quench, the capacity of the cooling device for the magnet system can optionally be fully concentrated on that group, with the result of a maximum recooling rate.

Moreover, the overall apparatus has only a brief down time. In view of an increased magnetic stray field during the asymmetrical operation, it is important to have the most symmetrical possible configuration of the magnets of the two groups.

In principle, the following structures of the magnet system are conceivable. If they are to be feasible, certain peripheral conditions or technical solutions may have to be provided, and under some circumstances they may not be as advantageous as the embodiment described above.

Another option is to have three or even more groups, wherein the number of groups is substantially dependent on a balancing of commercial aspects and aspects of operating safety. A plurality of magnets of one group can also jointly form annular segments, with the annular segments of the groups being disposed alternatingly in rings. In this way, something like a block formation of the groups is provided, and this may make for favorable manufacture or interconnection in the layout.

The magnet segments may also be connected parallel or only some of them may be connected parallel. This enables good adaptation to prevailing demands upon charging or discharging of the magnet system. In addition, even individual magnet segments can at least in part be turned off or bypassed. The result would be optimal adaptation of the magnet system to the existing situation in terms of capacity or operation. This may also require a suitable switching device that currently is not yet available.

It is understood that the characteristics described above may also be combined with one another or with characteristics from the prior art without departing from the fundamental concept of the present invention.

I claim:

1. A superconducting toroidal magnet system, comprising:

a toroidal magnet formed by a plurality of toroidally disposed magnet segments each assigned to one of a first group and a second group said magnet segments assigned to said first group being galvanically separated from said magnet segments assigned to said second group, said magnet segments assigned to said first group being disposed alternately with said magnet segments assigned to said second group, said magnet segments of said first group being inductively coupled to said magnet segments of said second group for energy transfer; and supply devices each connected to said magnet segments of a respective one of said first and second groups.

2. The magnet system according to claim 1, wherein said supply devices are computer-controlled inverters.

3. The magnet system according to claim 1, including a quench detector and at least one monitoring device, said quench detector being connected to said supply devices via said at least one monitoring device.

4. The magnet system according to claim 1, wherein said supply devices low-impedance internal resistors.

5. The magnet system according to claim 1, wherein the magnet system serves as an energy accumulator.

* * * * *